US012409767B2

(12) United States Patent
Ogawa et al.

(10) Patent No.: US 12,409,767 B2
(45) Date of Patent: Sep. 9, 2025

(54) DRINKING CONTAINER HOLDING DEVICE

(71) Applicants: NIFCO INC., Yokosuka (JP); KYOTECH CO., LTD., Kyoto (JP)

(72) Inventors: Takaya Ogawa, Yokosuka (JP); Masataka Saotome, Yokosuka (JP); Masao Toda, Kyoto (JP); Kazuhiko Miyamoto, Kyoto (JP)

(73) Assignees: NIFCO INC., Yokosuka (JP); KYOTECH CO., LTD., Kyoto (JP)

( * ) Notice: Subject to any disclaimer, the term of this patent is extended or adjusted under 35 U.S.C. 154(b) by 0 days.

(21) Appl. No.: 18/703,420

(22) PCT Filed: Oct. 11, 2022

(86) PCT No.: PCT/JP2022/037863
§ 371 (c)(1),
(2) Date: Apr. 22, 2024

(87) PCT Pub. No.: WO2023/074349
PCT Pub. Date: May 4, 2023

(65) Prior Publication Data
US 2025/0236229 A1    Jul. 24, 2025

(30) Foreign Application Priority Data
Oct. 26, 2021  (JP) ................. 2021-174716

(51) Int. Cl.
*B60N 3/10* (2006.01)
(52) U.S. Cl.
CPC .................. *B60N 3/104* (2013.01)

(58) Field of Classification Search
CPC ...................................................... B60N 3/104
(Continued)

(56) References Cited

U.S. PATENT DOCUMENTS 5,165,646 A * 11/1992 Gewecke ............... B60N 3/103
165/80.1
7,089,749 B1 * 8/2006 Schafer ................... F25B 21/04
62/3.2
(Continued)

FOREIGN PATENT DOCUMENTS

| JP | H04-71328 U | 6/1992 |
| JP | 2016068854 A | 5/2016 |
| KR | 20180068395 A | 6/2018 |

OTHER PUBLICATIONS

International Search Report (English and Japanese) and Written Opinion for International application No. PCT/JP2022/037863, dated Dec. 20, 2022, 10 pages.
(Continued)

*Primary Examiner* — Jacob K Ackun
(74) *Attorney, Agent, or Firm* — Tarolli, Sundheim, Covell &Tummino LLP

(57) ABSTRACT

Provided is a drinking container holding device that is configured to heat the drinking container. The drinking container holding device includes a plastic holder configured to hold a drinking container on the inner side of the holder, a sheet-like heat transfer element located on the outer side of the holder and having a higher thermal conductivity than the holder, a sheet heating element located on the outer side of the heat transfer element and smaller than the heat transfer element, and an insulating element covering the sheet heating element on the outer side of the sheet heating element.

8 Claims, 6 Drawing Sheets

(58) Field of Classification Search
USPC ......... 220/737, 738; 224/400, 275, 276, 483
See application file for complete search history.

(56) References Cited

U.S. PATENT DOCUMENTS

| | | | |
|---|---|---|---|
| 8,955,242 B2* | 2/2015 | Bruce ..................... | G09F 1/10 |
| | | | 40/604 |
| 2009/0224124 A1* | 9/2009 | Kniazyszcze .......... | B60N 3/102 |
| | | | 224/552 |
| 2018/0079344 A1* | 3/2018 | Uhlenbusch ............ | F25B 21/04 |
| 2020/0039411 A1* | 2/2020 | Paschal ................. | F25D 31/006 |
| 2021/0094455 A1* | 4/2021 | Vite Cadena .......... | B60N 3/103 |
| 2023/0264619 A1* | 8/2023 | MacLauchlan ......... | F25B 21/04 |
| | | | 62/244 |

OTHER PUBLICATIONS

Microfilm of the specification and drawings annexed to the request of Japanese Utility Model Application No. 115000/1990 (Laid-open No. 71328/1992) (Yamada, Yusaku) Jun. 24, 1992 (Jun. 24, 1992) specification, p. 2, line 9 to p. 3, line 16, fig. 1-3.

* cited by examiner

DRINKING CONTAINER HOLDING DEVICE

CROSS-REFERENCE TO RELATED APPLICATIONS

This application is a U.S. National Stage Application filed under 35 U.S.C. § 371 of PCT/JP2022/037863, filed Oct. 11, 2022, and entitled "DRINKING CONTAINER HOLDING DEVICE", which claims priority from Japanese Patent Application No. 2021-174716, filed on Oct. 26, 2021. The entire contents of each of the above-identified patent applications are incorporated herein by reference.

TECHNICAL FIELD

The present disclosure relates to a drinking container holding device.

BACKGROUND ART

An example of a drinking container holder includes a holder body configured to hold a drinking container. The holder body includes an inner case and an outer case arranged outside the inner case. The inner case is formed from metal. The outer case is formed from a polyurethane resin. The inner case is in contact with a Peltier element (for example, refer to Patent Literature 1).

CITATION LIST

Patent Literature

Patent Literature 1: Japanese Laid-Open Patent Publication No. 2016-068854

SUMMARY OF INVENTION

Technical Problem

The Peltier element is used as a heater that heats a portion of the inner case, which is used as a thermal conductor. The inner case includes an inner surface of the holder body. When the drinking container has heated to a predetermined temperature, the temperature of the inner surface of the holder body, which can contact a hand of a user, may be overly increased at only a portion of the inner surface that is in contact with the heater.

Solution to Problem

In an aspect of the present disclosure, a drinking container holding device is configured to heat a drinking container. The drinking container holding device includes a holder formed from resin and configured to hold the drinking container in the holder, a sheet-shaped thermal conductor arranged outside the holder and having a higher thermal conductivity than the holder, a sheet-like heating element arranged outside the thermal conductor, the sheet-like heating element being smaller than the thermal conductor, and a thermal insulator covering the sheet-like heating element outside the sheet-like heating element.

DESCRIPTION OF EMBODIMENTS

First Embodiment

Figure 1:
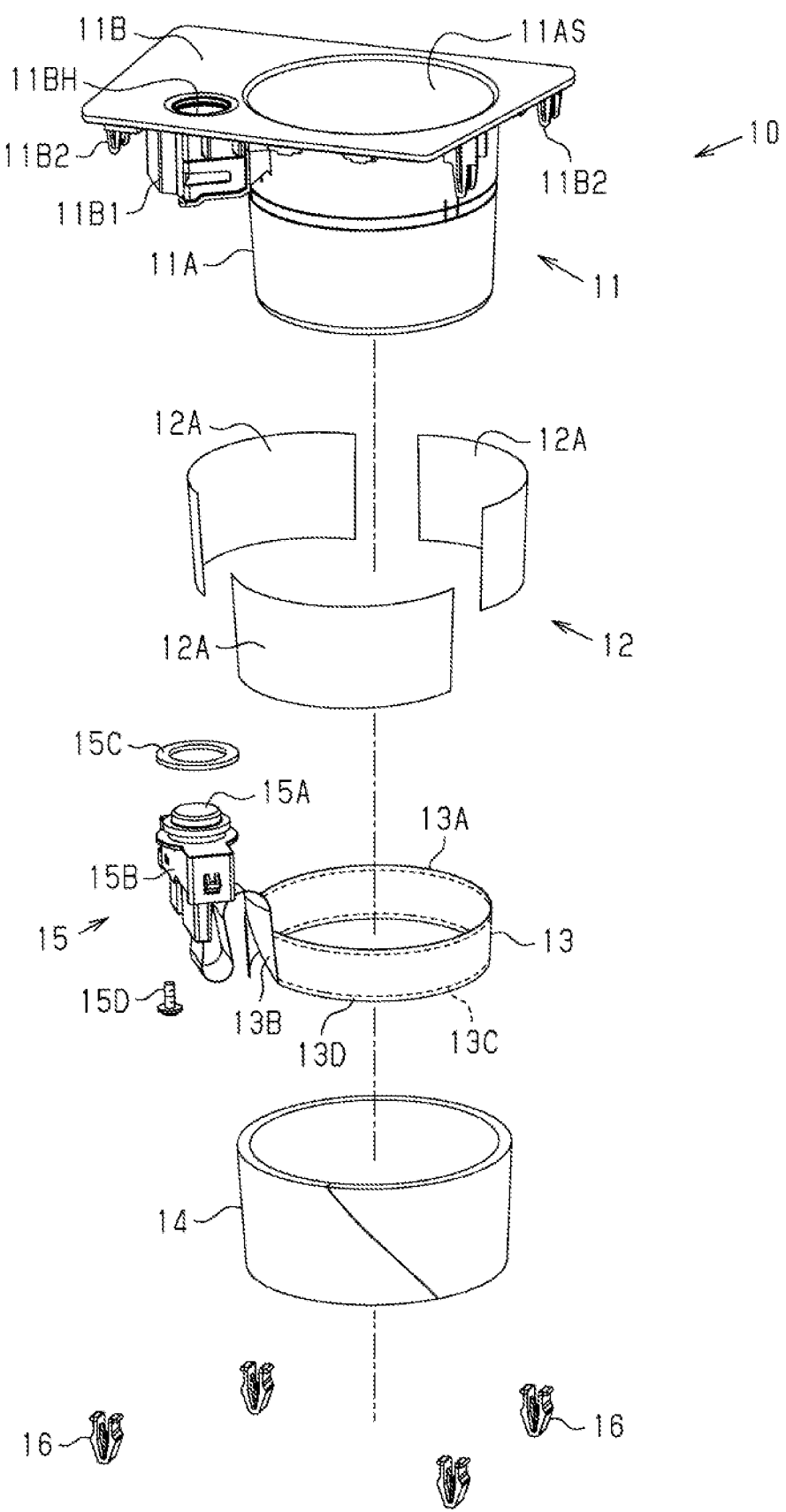
FIG. 1 is an exploded perspective view showing a first embodiment of a drinking container holding device before being assembled.

A first embodiment of a drinking container holding device will now be described with reference to FIGS. 1 to 6. FIG. 1 shows the drinking container holding device before being assembled.

In FIG. 1, a drinking container holding device 10 (hereafter, may be referred to as holding device) is configured to heat a drinking container. The drinking container may be, for example, a metal beverage can, a paper beverage cup, or a plastic beverage bottle. The holding device 10 includes a holder 11, a thermal conductor 12, a sheet-like heating element 13, and a thermal insulator 14. The holder 11 holds a drinking container in the holder 11. The holder 11 is formed from resin.

The thermal conductor 12 is arranged outside the holder 11. The thermal conductor 12 is sheet-shaped. The thermal conductor 12 has a higher thermal conductivity than the holder 11. The sheet-like heating element 13 is arranged outside the thermal conductor 12. The sheet-like heating element 13 is smaller than the thermal conductor 12. Hence, the sheet-like heating element 13 covers at least a portion of the thermal conductor 12. The thermal insulator 14 is arranged outside the sheet-like heating element 13 and covers the sheet-like heating element 13.

In the holding device 10 of the present disclosure, heat is transferred from the sheet-like heating element 13 to the drinking container through the thermal conductor 12, which is larger than the sheet-like heating element 13, and the resin holder 11. In this process, the thermal conductor 12 diffuses heat from the sheet-like heating element 13, and the resin holder 11 diffuses heat from the thermal conductor 12. The heat, which has diffused from the sheet-like heating element 13 through the thermal conductor 12 and the holder 11, is transferred to the drinking container in a wide area. In addition, the resin holder 11 hampers direct transfer of heat from the drinking container to the thermal conductor 12 while diffusing heat of the drinking container in the resin holder 11. Such heat diffusion by the resin holder 11 limits an uneven temperature distribution in the thermal conductor 12. Thus, heat appropriately diffuses from the sheet-like heating element 13. The diffusion of heat from the sheet-like heating element 13 and thermal insulation of the thermal insulator 14 result in uniform heating of the drinking container in a wide area while limiting an excessive increase in the temperature in a local area occupied by the sheet-like heating element 13.

The holder 11 is a resin mold component. The holder 11 may be formed from various synthetic resins. The holder 11 includes a tube 11A and a flange 11B. The tube 11A includes two axial ends and a bottom wall closing one of the two axial ends of the tube 11A. The tube 11A includes an inner surface defining an accommodation cavity 11AS. The accommodation cavity 11AS is sized to accommodate various drinking containers. As described above, the drinking container may be, for example, a beverage can, a beverage cup, or a beverage bottle. The holder 11 may be shaped to accommodate only a specific drinking container. In the present embodiment, the tube 11A is cylindrical. However, the tube 11A may be truncated-cone-shaped or polygonal.

The flange 11B overhangs from an open end of the tube 11A, which is one of the two ends, in a radial outward direction of the tube 11A. The flange 11B includes a through hole 11BH extending through the flange 11B in the thickness-wise direction. The flange 11B includes a retainer 11B1 and a hook 11B2. The flange 11B includes one retainer 11B1. The number of hooks 11B2 is the same as the number of clips 16, which will be described later.

The flange 11B includes two opposing surfaces in the flange 11B. One of the two opposing surfaces is an upper surface. The other surface is a lower surface. The retainer 11B1 projects downward from the lower surface of the flange 11B. In a view facing the lower surface, the retainer 11B1 extends around the through hole 11BH. Each hook 11B2 projects downward from the lower surface of the flange 11B in the same manner as the retainer 11B1.

The thermal conductor 12 includes thermal conducting sheets 12A. The thermal conducting sheets 12A may be formed from various metals. In an example, the thermal conducting sheets 12A are formed from aluminum. In the present embodiment, the thermal conductor 12 includes three thermal conducting sheets 12A. The thermal conducting sheets 12A are each rectangular. The thermal conducting sheets 12A are curved along an outer surface of the tube 11A. As described above, the tube 11A is round. Therefore, in a cross section orthogonal to the axial direction of the tube 11A, the thermal conducting sheets 12A are each arcuate such that the center of curvature is located in the tube 11A.

In the axial direction of the tube 11A, the thermal conducting sheet 12A has a smaller width than the tube 11A. The size, that is, the shape and the area, of the thermal conductor 12 is set so as to cover substantially the entirety of the lower half of the tube 11A. The lower half of the tube 11A is located below the retainer 11B1 and the hook 11B2 in the axial direction of the tube 11A.

The sheet-like heating element 13 is strip-shaped before being shaped in conformance with the outer shape of the tube 11A. When mounted on the holding device 10, the sheet-like heating element 13 includes an annular portion 13A and a bent portion 13B. The annular portion 13A is shaped in accordance with the outer shape of the tube 11A. The annular portion 13A is shaped so that the thermal conducting sheets 12A are sandwiched between the annular portion 13A and the tube 11A.

The bent portion 13B is joined to an end of the annular portion 13A. The bent portion 13B includes one or more bent portions. The bent portion 13B is shaped so as to be connected to an operating switch 15, which will be described later, and allow the operating switch 15 to be mounted on the flange 11B.

Figure 6:
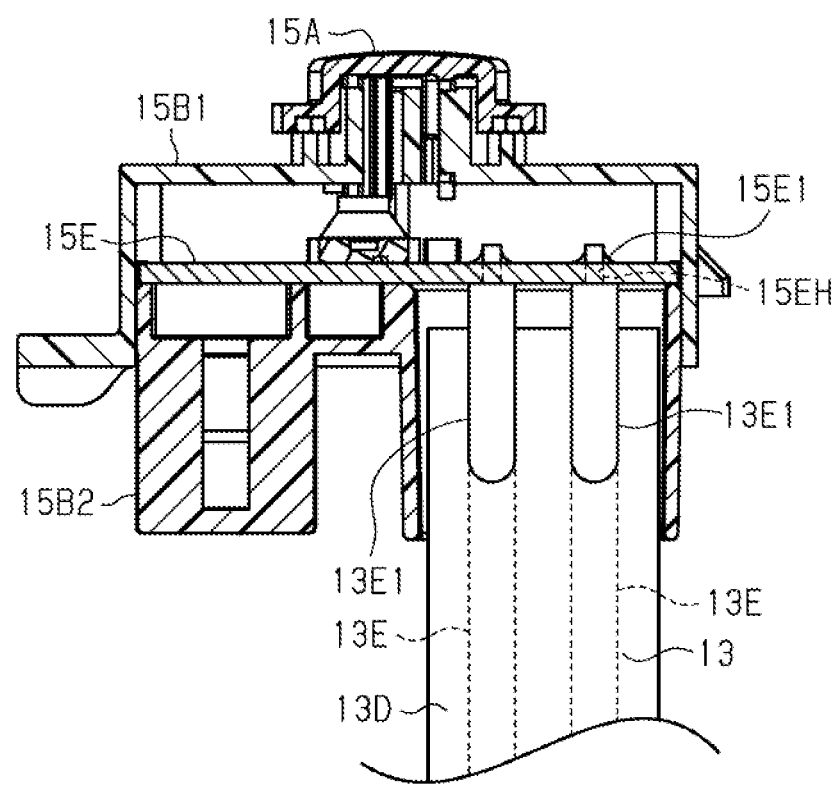
FIG. 6 is a cross-sectional view showing the structure of the operating switch shown in FIG. 5 and a portion of the sheet-like heating element.

The sheet-like heating element 13 includes a resistive heating line 13C and a sheet-like wire (refer to FIG. 6). The resistive heating line 13C extends on the annular portion 13A in a sheet-like manner. The sheet-like wire is connected to the resistive heating line 13C and a circuit substrate (refer to FIG. 6), which will be described later, and supplies current to the resistive heating line 13C. Thus, the sheet-like heating element 13 is configured to generate heat along the shape of the sheet in the entirety of the annular portion 13A. In contrast, the bent portion 13B includes only the sheet-like wire. The sheet-like heating element 13 includes an insulative cover 13D. The cover 13D covers the resistive heating line 13C and the sheet-like wire.

In the axial direction of the tube 11A, the sheet-like heating element 13, or the annular portion 13A, has a smaller width than the thermal conductor 12, or the thermal conducting sheet 12A. Hence, the sheet-like heating element 13, or the annular portion 13A, is smaller than the thermal conductor 12 in size, in other words, in shape and area. Therefore, when the holding device 10 is assembled, the annular portion 13A is located in the boundary of the thermal conductor 12.

The operating switch 15 is a mechanism for supplying current to the sheet-like heating element 13. The operating switch 15 includes an operating button 15A, a case 15B, a packing 15C, and a fastening member 15D. The operating button 15A is configured to control a start and a stop of the supply of current to the sheet-like heating element 13. The case 15B accommodates the circuit substrate, which will be described later. The circuit substrate is connected to the operating button 15A and the sheet-like heating element 13. When the operating switch 15 is mounted on the holder 11, the packing 15C is arranged between the operating button 15A and the flange 11B to restrict permeation of liquid from the flange 11B toward the operating switch 15. The fastening member 15D fastens the case 15B to the flange 11B.

The thermal insulator 14 is formed from resin. The thermal insulator 14 has the form of a tube extending along the outer surface of the tube 11A. The thermal insulator 14 includes two ends that are open in the axial direction of the tube 11A. In the axial direction of the tube 11A, the thermal insulator 14 has a greater width than the thermal conducting sheets 12A and the annular portion 13A. The size, that is, the shape and the area, of the thermal insulator 14 is set so as to cover the lower half of the tube 11A.

In the present embodiment, the thermal insulator 14 includes two ends in the circumferential direction of the thermal insulator 14. The thermal insulator 14 is elastic so that the one end is separable from the other end in the circumferential direction of the thermal insulator 14. The thermal insulator 14 may be formed from, for example, foam rubber or resin. Thus, when the thermal conductor 12 and the sheet-like heating element 13 are sandwiched between the thermal insulator 14 and the tube 11A, the thermal insulator 14 is readily coupled to the tube 11A.

The holding device 10 includes clips 16. The clips 16 are resin mold components. In the present embodiment, the holding device 10 includes four clips 16. Alternatively, the holding device 10 may include three clips 16 or less and five clips 16 or more. The clips 16 are each hooked on a different one of the hooks 11B2. The clips 16 extend in the axial direction of the tube 11A. The clips 16 are configured to fix the holding device 10 to a subject in which the holding device 10 is installed. The installation subject of the holding device 10 is, for example, a vehicle.

Figure 2:
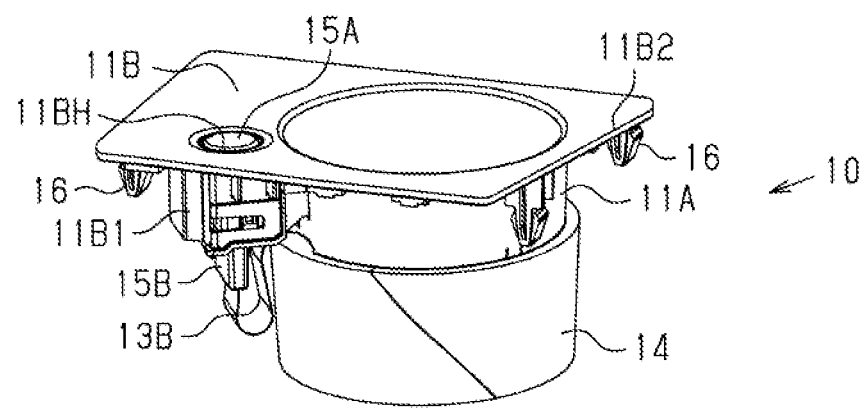
FIG. 2 is a perspective view of the drinking container holding device shown in FIG. 1 when assembled.

FIG. 2 shows the assembled holding device 10.

As shown in FIG. 2, when the holding device 10 is assembled, the thermal insulator 14 covers the lower half of the tube 11A so that the thermal conducting sheets 12A and the annular portion 13A are sandwiched between the thermal insulator 14 and the tube 11A. The clips 16, which are hooked on the hooks 11B2, and the case 15B, which is retained by the retainer 11B1, are located at an outer side of the thermal insulator 14 in the radial direction of the tube 11A and above the thermal insulator 14 in the axial direction of the tube 11A. The bent portion 13B of the sheet-like heating element 13 is exposed from the thermal insulator 14.

The operating switch 15 is retained by the retainer 11B1 so that the top surface of the operating button 15A is exposed from the through hole 11BH in a view facing the upper surface of the flange 11B. Thus, the operating switch 15 is mounted on the holder 11. As described above, since the operating switch 15 is mounted on the holder 11, the installation subject of the holding device 10 does not need a separate structure for mounting the operating switch 15 in addition to the holding device 10. The operating button 15A, located in the through hole 11BH of the flange 11B, is pressed by a user of the holding device 10.

Figure 3:
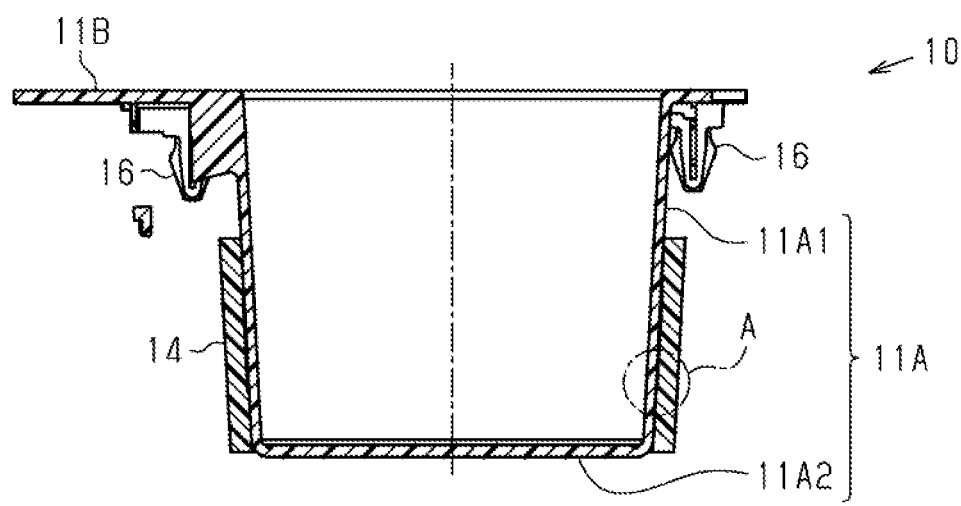
FIG. 3 is a cross-sectional view showing the structure of the drinking container holding device shown in FIG. 1.

FIG. 3 is a cross-sectional view showing the structure of the holding device 10.

As shown in FIG. 3 and described above, the holder 11 includes the tube 11A. The tube 11A includes a circumferential wall 11A1 and a bottom wall 11A2. The circumferential wall 11A1 has the form of a round tube surrounding a drinking container. The bottom wall 11A2 supports the drinking container in the holder 11. The thermal insulator 14 has the form of a round tube and covers the lower half of the circumferential wall 11A1.

Figure 4:
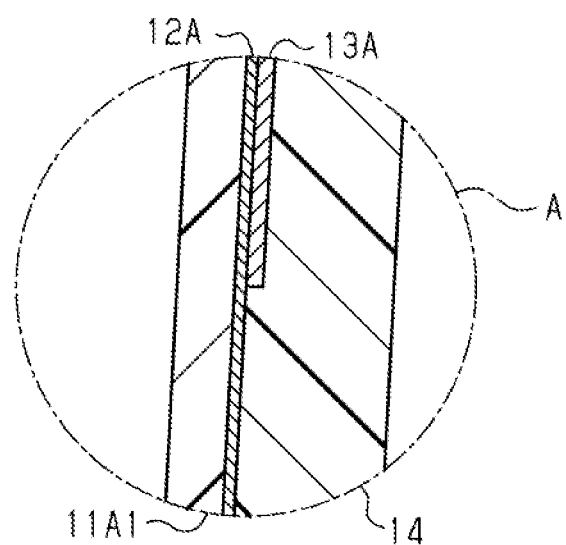
FIG. 4 is an enlarged cross-sectional view of region A shown in FIG. 3.

FIG. 4 is an enlarged view of the structure in region A shown in FIG. 3.

As shown in FIG. 4, the circumferential wall 11A1 includes an outer surface that is in contact with the thermal conducting sheet 12A of the thermal conductor 12. Thus, the holding device 10 surrounds the drinking container and heats the drinking container. The entirety of the drinking container is heated in a preferred manner.

The outer surface of the thermal conducting sheets 12A is in contact with the annular portion 13A of the sheet-like heating element 13. Thus, when the sheet-like heating element 13 generates heat, the heat is transferred to the thermal conductor 12 more efficiently than in a structure having a gap between the annular portion 13A and the thermal conducting sheets 12A.

The thermal insulator 14 may include an inner surface having rigidity that allows the inner surface to be deformed in conformance with the outer surface of the thermal conducting sheets 12A and the outer surface of the annular portion 13A. As described above, the thermal insulator 14 may be formed from, for example, foam rubber or resin to have a rigidity that allows the inner surface of the thermal insulator 14 to be deformed in conformance with the outer surface of the thermal conducting sheets 12A and the outer surface of the annular portion 13A. Thus, a gap is not formed between thermal insulator 14 and the thermal conducting sheets 12A. This further limits discharging of heat from the thermal conductor 12 to the exterior.

The structure of the operating switch 15 will now be described in more detail with reference to FIGS. 5 and 6.

Figure 5:
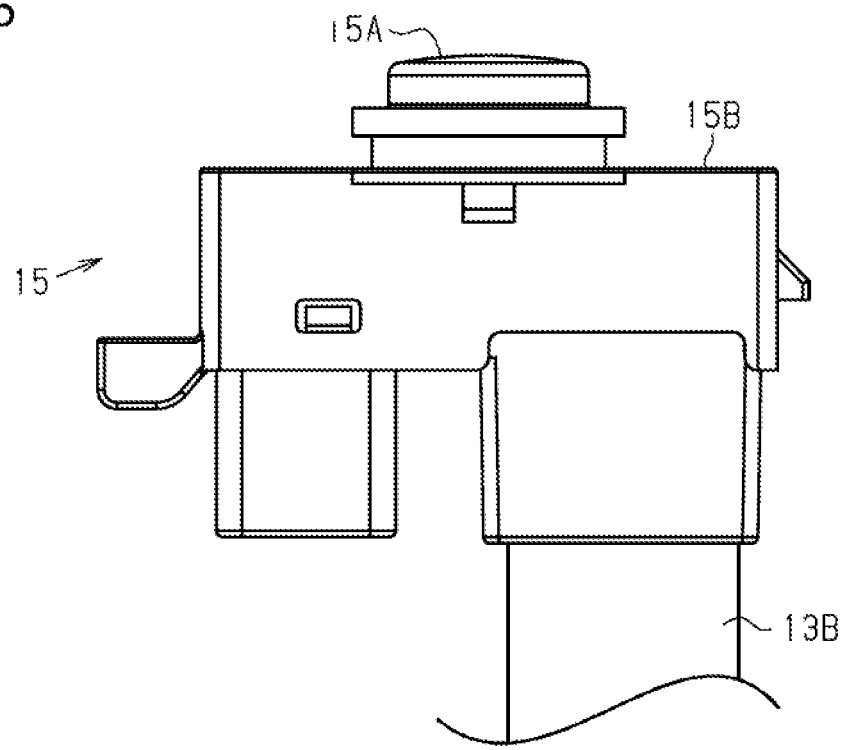
FIG. 5 is a side view showing the structure of an operating switch and a portion of a sheet-like heating element that are included in the drinking container holding device shown in FIG. 1.

FIG. 5 is a side view showing the structure of the operating switch 15. FIG. 6 is a cross-sectional view showing the structure of the operating switch 15 taken in the vertical direction.

As shown in FIG. 5 and described above, the operating switch 15 includes the operating button 15A and the case 15B. The bent portion 13B of the sheet-like heating element 13 includes one end connected to the annular portion 13A and an opposite end located in the case 15B.

As shown in FIG. 6, the case 15B of the operating switch 15 accommodates a circuit substrate 15E. The case 15B includes an upper case 15B1 and a lower case 15B2. The operating button 15A is located on the upper case 15B1. The circuit substrate 15E is located on an upper portion of the lower case 15B2 and is covered by the upper case 15B1. The operating switch 15 has the circuit substrate 15E switch between supply and interruption of current. The operating switch 15 is configured to have the circuit substrate 15E switch between supply and interruption of current when the operating button 15A is pressed.

The circuit substrate 15E supplies current to the sheet-like heating element 13. As described above, the sheet-like heating element 13 includes the resistive heating line 13C (refer to FIG. 1) and the sheet-like wire 13E. The sheet-like wire 13E includes a first end connected to the resistive heating line 13C and a second end connected to the circuit substrate 15E defining external connection terminals 13E1. The external connection terminals 13E1 of the sheet-like wire 13E are exposed from the cover 13D.

The circuit substrate 15E includes fitting holes 15EH into which the external connection terminals 13E1 of the sheet-like wire 13E are fitted. The fitting holes 15EH extend through the circuit substrate 15E in a thickness-wise direction of the circuit substrate 15E. The circuit substrate 15E includes two fitting holes 15EH. When fitted into the fitting holes 15EH, the external connection terminals 13E1 are soldered. More specifically, solder 15E1 is applied to the circuit substrate 15E around the fitting holes 15EH. The solder 15E1 covers the fitting holes 15EH and the portions of the external connection terminals 13E1 fitted into the fitting holes 15EH.

This structure eliminates the need for a further member between the sheet-like heating element 13 and the circuit substrate 15E, thereby reducing the cost for manufacturing the holding device 10. The further member is, for example, a cord or a connector.

As described above, the drinking container holding device according to the first embodiment has the following advantages.

(1-1) While the drinking container is uniformly heated in a wide area, the temperature is not overly increased in a local area occupied by the sheet-like heating element 13.

(1-2) The holding device 10 surrounds the drinking container and heats the drinking container. Thus, the entirety of the drinking container is heated in a preferred manner.

(1-3) There is no need for a further member between the sheet-like heating element 13 and the circuit substrate 15E. This reduces the cost for manufacturing the holding device 10.

(1-4) Since the operating switch 15 is mounted on the holder 11, the installation subject of the holding device 10 does not need a separate structure for mounting the operating switch 15 in addition to the holding device 10.

(1-5) The thermal conducting sheets 12A each have a smaller area as compared to a structure in which the thermal conductor 12 includes only a single thermal conducting sheet. Thus, the thermal conducting sheets 12A are easily manipulated.

The embodiment may be modified as follows.

[Operating Switch]

The operating switch 15 does not necessarily have to be mounted on the holder 11. In this case, for example, the operating switch 15 may be mounted on the installation subject of the holding device 10 at a position separated from the holder 11.

[Sheet-Like Heating Element]

The external connection terminals 13E1 of the sheet-like heating element 13 do not necessarily have to be soldered to the circuit substrate 15E. In this case, for example, wires may be arranged between the circuit substrate 15E and the external connection terminals 13E1 of the sheet-like heating element 13 to connect the external connection terminals 13E1 to the circuit substrate 15E.

[Thermal Conductor]

The thermal conductor 12 may include a thermal conducting sheet, which will be described with reference to FIGS. 7 and 8.

Figure 7:
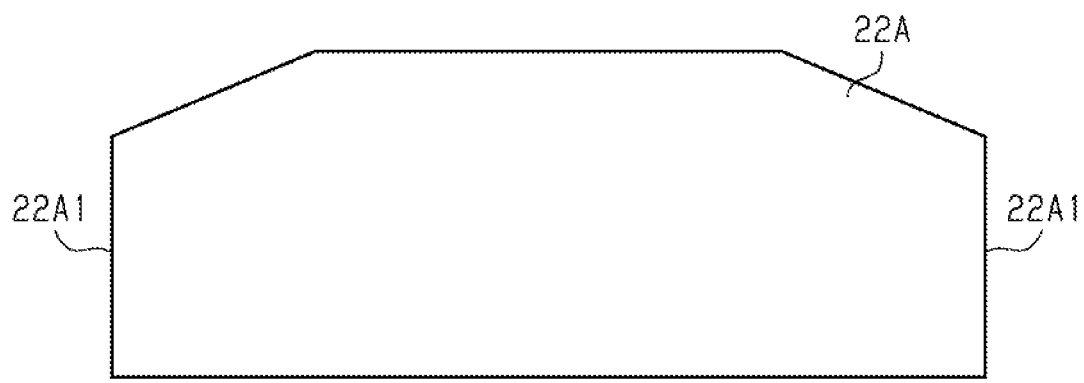
FIG. 7 is a plan view showing the structure of a modified example of a thermal conducting sheet included in the drinking container holding device shown in FIG. 1.

As shown in FIG. 7, each thermal conducting sheet 22A is hexagonal. The thermal conducting sheet 22A has the form of a hexagon obtained by cutting off two corners of a rectangle located next to each other in a longitudinal direction. The thermal conducting sheet 22A includes two ends 22A1 in the longitudinal direction.

Figure 8:
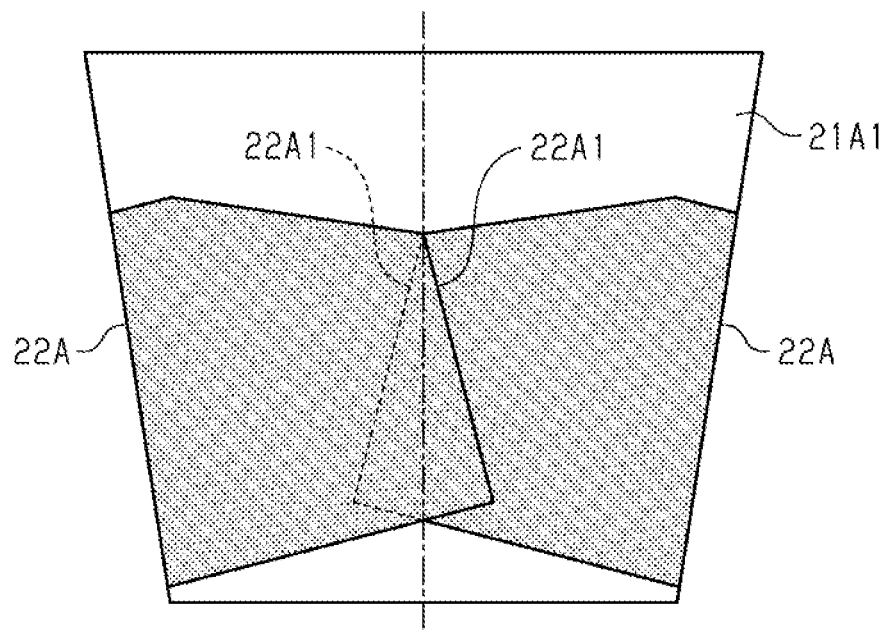
FIG. 8 is a plan view showing the thermal conducting sheet shown in FIG. 7 and the structure of a holder.

As shown in FIG. 8, a circumferential wall 21A1 has a tubular surface shaped as a truncated cone. The thermal conducting sheets 22A of the thermal conductor 12 are attached to an outer surface of the circumferential wall 21A1. Each thermal conducting sheet 22A is attached to the outer surface so that one side of the thermal conducting sheet 22A extends in a circumferential direction of the outer surface. The thermal conducting sheet 22A includes ends 22A1, each of which overlaps an end of an adjacent one of the thermal conducting sheets 22A.

The thermal conductor 12 described above has the following advantages.

(1-6) The thermal conductor is arranged on the truncated-cone-shaped circumferential wall 21A1 so that the thermal conducting sheets 22A are aligned with each other at the height-wise position and surround the circumferential wall 21A1. Thus, even when the holder 11 has a tubular surface shaped as a truncated cone, a desired range of the drinking container is heated in a preferred manner.

The hexagonal thermal conducting sheet 22A has the following advantages over a rectangular thermal conducting sheet 22A. When a rectangular thermal conducting sheet is wrapped around along an outer surface of the truncated-cone-shaped circumferential wall 21A1, longitudinal ends of the thermal conducting sheet will be located above a longitudinal center of the thermal conducting sheet in the axial direction of the circumferential wall 21A1. In this regard, if the longitudinal center of the thermal conducting sheet is increased in width, the longitudinal ends may exceed a cover region that needs to be covered by the thermal conducting sheet in the axial direction of the circumferential wall 21A1. Hence, to maintain the rectangular shape of the thermal conducting sheet, the thermal conducting sheet needs to be decreased in width so that the longitudinal ends will not exceed the cover region.

In the hexagonal thermal conducting sheet 22A, the corners of the longitudinal ends are cut off. This allows the hexagonal thermal conducting sheet 22A to have an increased width with which the longitudinal ends of the rectangular thermal conducting sheet 22A may exceed the cover region. In other words, even when the thermal conducting sheet 22A is increased in width, the longitudinal ends are not likely to exceed the cover region as compared to a rectangular thermal conducting sheet. As a result, the range in which the thermal conductor 12 transfers heat from the sheet-like heating element 13 may extend.

The thermal conductor 12 may include two thermal conducting sheets 12A or less and four thermal conducting sheets 12A or more. When the thermal conductor 12 includes two thermal conducting sheets 12A or more, the thermal conducting sheets 12A may be mounted on the holding device 10 so that two thermal conducting sheets 12A or more are located next to each other in the axial direction of the tube 11A.

The thermal conductor 12 may be arranged outside the holder 11 at the outside of the bottom wall 11A2 without being arranged at the outside of the circumferential wall 11A1. In this case, the sheet-like heating element 13 and the thermal insulator 14 may also be located at only the outside of the bottom wall 11A2. This structure still obtains an advantage according to the above advantage (1-1).

Second Embodiment

A second embodiment of a drinking container holding device will now be described with reference to FIG. 9. The second embodiment differs from the first embodiment in the shape of a thermal conducting sheet of a thermal conductor. Thus, the differences will be described in detail. Components of the drinking holding device other than the thermal conductor will not be described in detail.

Figure 9:
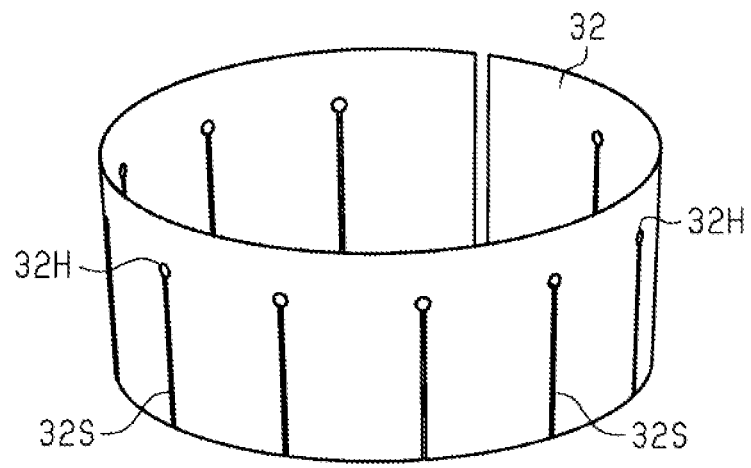
FIG. 9 is a perspective view showing the structure of a thermal conductor of a drinking container holding device in a second embodiment.

FIG. 9 is a perspective view showing the structure of a thermal conductor.

As shown in FIG. 9, the thermal conductor includes a single thermal conducting sheet 32. The thermal conducting sheet 32 is strip-shaped and is wrapped around an outer surface of the circumferential wall 11A1 in the circumferential direction of the outer surface. The thermal conducting sheet 32 includes slits 32S. Each of the slits 32S extends from one side of the outer surface extending in the circumferential direction in a direction intersecting the circumferential direction of the outer surface. The slits 32S are arranged at intervals in the circumferential direction of the outer surface.

In the example shown in FIG. 9, the thermal conducting sheet 32 is sized to cover the lower half of the circumferential wall 11A1 in the same manner as the thermal conducting sheets 12A of the first embodiment. The thermal conducting sheet 32 includes two opposing sides in the axial direction of the circumferential wall 11A1. One of the two sides is an upper side, and the other is a lower side. The slits 32S extend from the lower side toward the upper side in the axial direction of the circumferential wall 11A1. The slits 32S are arranged at equal intervals in the circumferential direction.

Thus, when the thermal conducting sheet 32 is wrapped around the outer surface of the circumferential wall 11A1, the width of the slits 32S may be changed in the circumferential direction of the circumferential wall 11A1 as compared to before the thermal conducting sheet 32 is wrapped. In addition, when the thermal conducting sheet 32 is wrapped around the outer surface of the circumferential wall 11A1, the portion located between adjacent ones of the slits 32S is deformable. Thus, the thermal conducting sheet 32 including the slits 32S is readily attached in conformance with the structure of the holder 11.

Each slit 32S includes an end located at the lower side, defining a basal end, and an end located between the lower side and the upper side, defining a distal end. The thermal conducting sheet 32 includes a through hole 32H continuous with the distal end of the slit 32S. The through holes 32H extend through the thermal conducting sheet 32 in the thickness-wise direction of the thermal conducting sheet 32. In a view facing the outer surface of the thermal conducting sheet 32, the contour of the through hole 32H is circular.

As described above, the thermal conducting sheet 32 includes the through holes 32H continuous with the distal ends of the slits 32S. Thus, when the portions of the thermal conducting sheet 32 located between adjacent ones of the slits 32S are deformed in the circumferential direction of the circumferential wall 11A1 or are bent in the radial direction of the circumferential wall 11A1, the thermal conducting sheet 32 is less likely to be torn at the distal ends of the slits 32S.

As described above, the drinking container holding device according to the second embodiment has the following advantage in addition to the above advantages (1-1) to (1-4).

(2-1) The thermal conducting sheet 32 is readily attached in conformance with the structure of the holder 11.

The second embodiment may be modified as follows.
[Thermal Conducting Sheet]

The through holes 32H may be omitted from the thermal conducting sheet 32. Even in this case, the thermal conducting sheet 32 including the slits 32S obtains an advantage according to the above advantage (2-1).

The direction in which the slits 32S extend is not limited to the axial direction of the circumferential wall 11A1 and may be a direction extending from the lower side toward the upper side and intersecting with the axial direction. Even in this case, an advantage according to the above advantage (2-1) is obtained.

The slits 32S may extend from the upper side toward the lower side of the thermal conducting sheet 32. More specifically, the basal end of the slit 32S may be located at the upper side, and the distal end may be located between the upper side and the lower side. In this case, following advantages are obtained.

(2-2) When the circumferential wall 11A1 has the form of a truncated cone extending in the axial direction, for example, the width of the slit 32S in the circumferential direction of the circumferential wall 11A1 may be gradually increased in the axial direction, that is, the direction extending from the lower side toward the upper side of the thermal conducting sheet 32. Thus, the single thermal conducting sheet 32 is readily attached in conformance with the outer surface of the circumferential wall 11A1.

The width of the thermal conducting sheet 32 may be greater than the width of the lower half of the circumferential wall 11A1. In this case, the distal end of the slit 32S may be located above the bottom wall 11A2. This structure obtains the following advantages.

(2-3) The portions of the thermal conducting sheet 32 including the slits 32S may extend beyond the circumferential wall 11A1 toward the bottom wall 11A2. The portions extending to the bottom surface of the bottom wall 11A2 may be attached to the bottom surface so that the extended portions are bent. The thermal conducting sheet 32 transfers heat generated by the sheet-like heating element 13 along the bottom wall 11A2.

When the circumferential wall 11A1 has the form of a truncated cone extending in the axial direction and the slits 32S are arranged at equal intervals, the portions of the thermal conducting sheet 32 covering a lower portion of the circumferential wall 11A1 overlap one another, and the portions of the thermal conducting sheet 32 covering the bottom wall 11A2 overlap one another. In particular, in the portions of the thermal conducting sheet 32 covering the bottom wall 11A2, the overlap is increased in size, and thus the volume of the thermal conducting sheet 32 per unit area is increased. Hence, even when the sheet-like heating element 13 is located on only the circumferential wall 11A1, heat generated by the sheet-like heating element 13 is readily transferred to the bottom wall 11A2. As a result, the entirety of the holder 11 is readily heated.

Other Modified Examples

The drinking holding device of the second embodiment may be implemented by combining the modified example of the first embodiment related to the operating switch 15 with the modified example of the first embodiment related to the sheet-like heating element 13.

Third Embodiment

A third embodiment of a drinking container holding device will now be described with reference to FIGS. 10 and 11. The third embodiment differs from the first embodiment in the shape of a thermal conducting sheet of a thermal conductor and the structure of a thermal insulator. Thus, the differences will be described in detail. Components of the drinking holding device other than the thermal conductor and the thermal insulator will not be described in detail.

Figure 10:
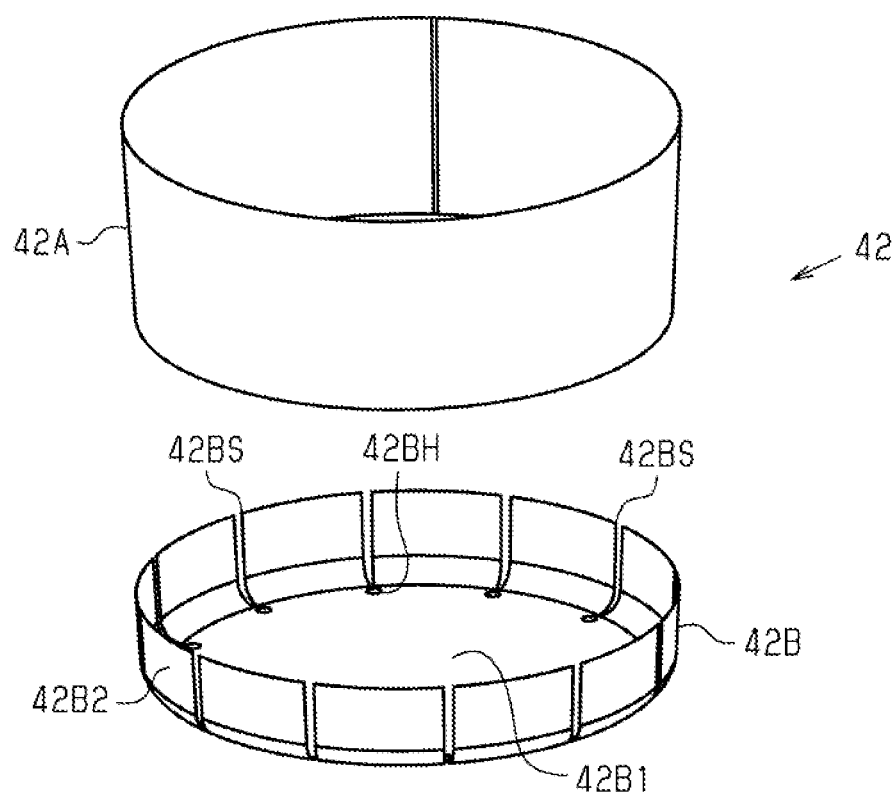
FIG. 10 is a perspective view showing the structure of a thermal conductor of a drinking container holding device in a third embodiment.

FIG. 10 is a perspective view showing the structure of a thermal conductor.

As shown in FIG. 10, a thermal conductor 42 includes a circumferential wall sheet 42A and a bottom wall sheet 42B. The circumferential wall sheet 42A has the form of a round tube extending along the outer surface of the circumferential wall 11A1. The circumferential wall sheet 42A is a single strip-shaped sheet extending along the outer surface of the circumferential wall 11A1.

The bottom wall sheet 42B includes a bottom wall portion 42B1 and a side wall portion 42B2. The bottom wall portion 42B1 is circular and extends along the bottom wall 11A2. The side wall portion 42B2 is annular and extends upward from the edge of the bottom wall portion 42B1. The side wall portion 42B2 includes slits 42BS. Each slit 42BS includes a distal end at the edge of the bottom wall portion 42B1 and extends through the side wall portion 42B2 in the axial direction of the circumferential wall 11A1. The slits 42BS are arranged at equal intervals in the circumferential direction of the circumferential wall 11A1.

The edge of the bottom wall portion 42B1 includes through holes 42BH. The through holes 42BH extend through the bottom wall portion 42B1 in the thickness-wise direction of the bottom wall portion 42B1. The through holes 42BH are arranged at equal intervals in the circumferential direction of the circumferential wall 11A1. The through holes 42BH are each continuous with a different one of the slits 42BS. Thus, when the side wall portion 42B2 is bent, the bottom wall sheet 42B is less likely to be torn at the distal ends of the slits 42BS.

When the thermal conductor 42 is coupled to the holding device 10, the side wall portion 42B2 of the bottom wall sheet 42B covers the lower end of the circumferential wall sheet 42A. Thus, heat generated by the sheet-like heating element 13 is transferred to the bottom wall sheet 42B through the circumferential wall sheet 42A. When the thermal conductor 42 is coupled to the holding device 10, the bottom wall portion 42B1 of the bottom wall sheet 42B is in contact with the bottom surface of the bottom wall 11A2.

The drinking container continuously contacts the bottom wall 11A2, which is the heat source, because of the weight of the drinking container. Thus, the drinking container is heated in a preferred manner.

Figure 11:
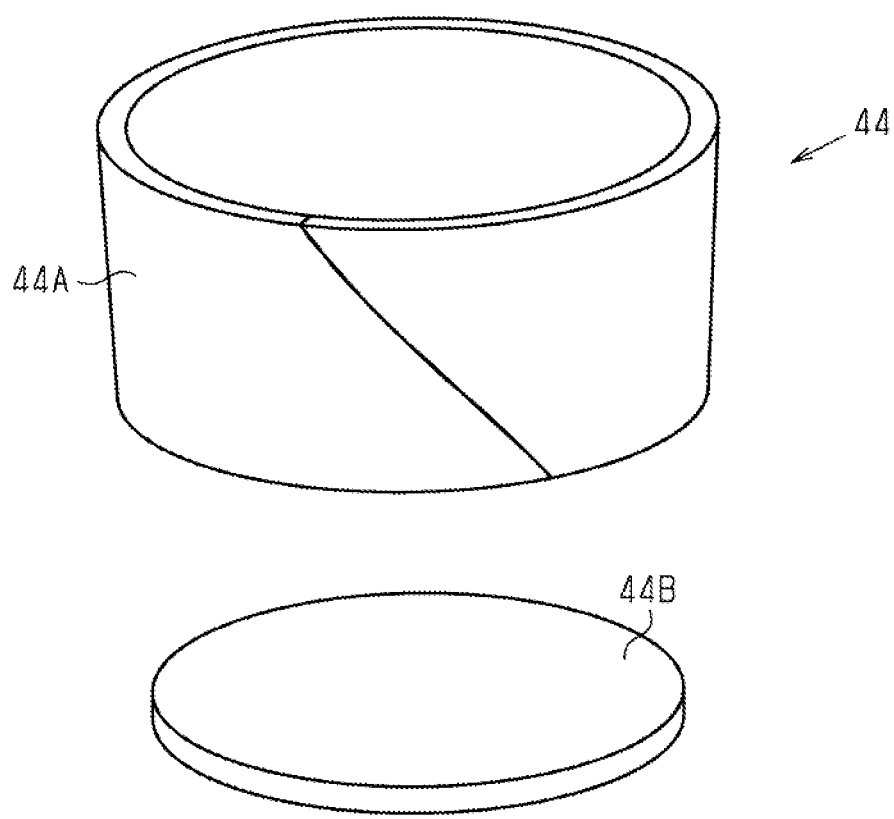
FIG. 11 is a perspective view showing the structure of a thermal insulator of the drinking container holding device in the third embodiment.

FIG. 11 is a perspective view showing the structure of a thermal insulator.

As shown in FIG. 11, a thermal insulator 44 includes a circumferential wall portion 44A and a bottom wall portion 44B. The circumferential wall portion 44A has the form of a round tube extending along the outer surface of the circumferential wall 11A1. The bottom wall portion 44B is disc-shaped in conformance with the shape of the bottom wall 11A2. When the thermal insulator 44 is coupled to the holding device 10, the circumferential wall portion 44A covers the outer surface of the circumferential wall sheet 42A, and the bottom wall portion 44B covers the bottom surface of the bottom wall sheet 42B.

As described above, the drinking container holding device according to the third embodiment has the following advantage in addition to the advantages (1-1) to (1-4).

(3-1) The drinking container continuously contacts the heat source because of the weight of the drinking container. Thus, the drinking container is heated in a preferred manner.

The third embodiment may be modified as follows.

[Thermal Conducting Sheet]

The through holes 42BH may be omitted from the bottom wall sheet 42B. Even in this case, the thermal conductor 42 including the bottom wall sheet 42B obtains an advantage according to the advantage (3-1) described above.

The slits 42BS may be omitted from the bottom wall sheet 42B. Even in this case, the bottom wall sheet 42B that includes the bottom wall portion 42B1 and the side wall portion 42B2 may be formed by, for example, forming gathers in the boundary between the bottom wall portion 42B1 and the side wall portion 42B2 when bending the side wall portion 42B2 upward from the bottom wall portion 42B1. Even in this case, the thermal conductor 42 including the bottom wall sheet 42B obtains an advantage according to the advantage (3-1) described above.

[Sheet-Like Heating Element]

The sheet-like heating element may be arranged outside the bottom wall sheet 42B in addition to the outside of the circumferential wall sheet 42A. In this case, the drinking container held by the holding device 10 is further readily heated.

The sheet-like heating element may be arranged at the outside of the bottom wall sheet 42B without being arranged at the outside of the circumferential wall sheet 42A. Even in this case, heat generated by the sheet-like heating element transfers to the circumferential wall sheet 42A through the bottom wall sheet 42B. Thus, the entirety of the dinking container is readily heated.

Other Modified Examples

The drinking holding device of the third embodiment may be implemented by combining the modified example of the first embodiment related to the operating switch 15 with the modified example of the first embodiment related to the sheet-like heating element 13. The thermal insulator 44 of the drinking holding device of the third embodiment may be combined with the drinking holding device of the first embodiment.

The drinking holding device of the third embodiment may be implemented in combination with the drinking holding device of the second embodiment. More specifically, in the drinking holding device of the second embodiment, the thermal conductor may further include the bottom wall sheet 42B of the thermal conductor 42 of the third embodiment in addition to the thermal conducting sheet 32. The drinking holding device of the second embodiment may include the thermal insulator 44 of the drinking holding device of the third embodiment.

[Common Challenge]

The drinking container holding device of the present disclosure takes on a common challenge for increasing convenience in a vehicle cabin when the drinking container holding device is used in a vehicle. In particular, the drinking holding device solves a proposition for increasing the usability of a drinking container holding device.

The invention claimed is:

1. A drinking container holding device configured to heat a drinking container, the drinking container holding device, comprising:
   a holder formed from resin and configured to hold the drinking container in the holder;
   a sheet-shaped thermal conductor arranged outside the holder and having a higher thermal conductivity than the holder;
   a sheet-like heating element arranged outside the thermal conductor, the sheet-like heating element being smaller than the thermal conductor; and
   a thermal insulator covering the sheet-like heating element outside the sheet-like heating element.

2. The drinking container holding device according to claim 1, wherein
   the holder includes a round, tubular circumferential wall configured to surround the drinking container, and
   the circumferential wall includes an outer surface in contact with the thermal conductor.

3. The drinking container holding device according to claim 2, wherein the thermal conductor includes thermal conducting sheets.

4. The drinking container holding device according to claim 3, wherein
   the circumferential wall is truncated-cone-shaped, and
   each of the thermal conducting sheets is hexagonal and is attached to the outer surface of the circumferential wall so that one side of each of the thermal conducting sheets extends in a circumferential direction of the outer surface of the circumferential wall.

5. The drinking container holding device according to claim 2, wherein
   the thermal conductor includes a single strip-shaped thermal conducting sheet wrapped around the outer surface of the circumferential wall in a circumferential direction of the outer surface,
   the thermal conducting sheet includes slits extending in a direction intersecting the circumferential direction from one side that extends in the circumferential direction, and
   the slits are arranged at an interval in the circumferential direction.

6. The drinking container holding device according to claim 1, wherein
   the holder includes a bottom wall configured to support the drinking container, and
   the bottom wall includes a bottom surface in contact with the thermal conductor.

7. The drinking container holding device according to claim 1, further comprising:
   a circuit substrate configured to supply current to the sheet-like heating element, wherein
   the sheet-like heating element includes
   a resistive heating line extending in a sheet-like manner, and a sheet-like wire including a first end connected to the resistive heating line and a second end connected to the circuit substrate, the second end defining an external connection terminal, the circuit substrate includes a fitting hole into which the external connection terminal of the sheet-like wire is fitted, and the external connection terminal is fitted into the fitting hole and soldered.

8. The drinking container holding device according to claim 7, further comprising:

an operating switch accommodating the circuit substrate and being configured to switch between supply and interruption of current to the circuit substrate, wherein the operating switch is mounted on the holder.

* * * * *